April 16, 1940.  G. MAIURI  2,197,001

ABSORPTION REFRIGERATING MACHINE

Filed Feb. 25, 1939   3 Sheets-Sheet 1

Inventor
GUIDO MAIURI
BY: Francis E. Boyce
ATTORNEY

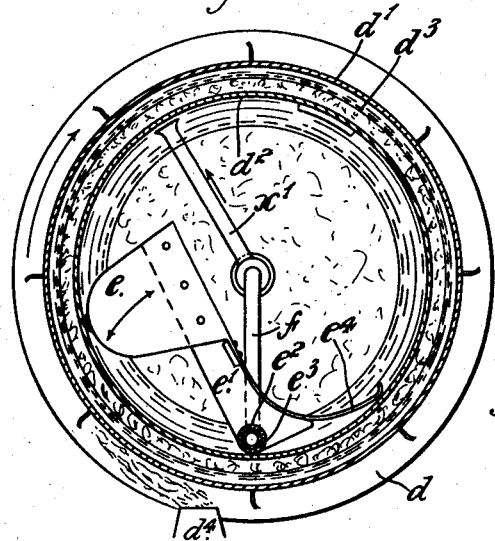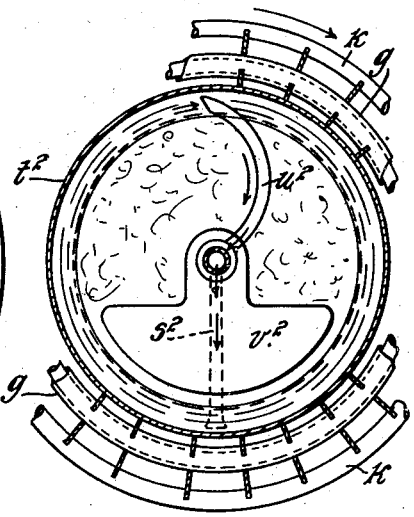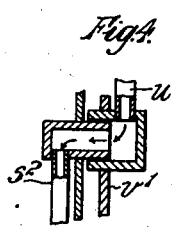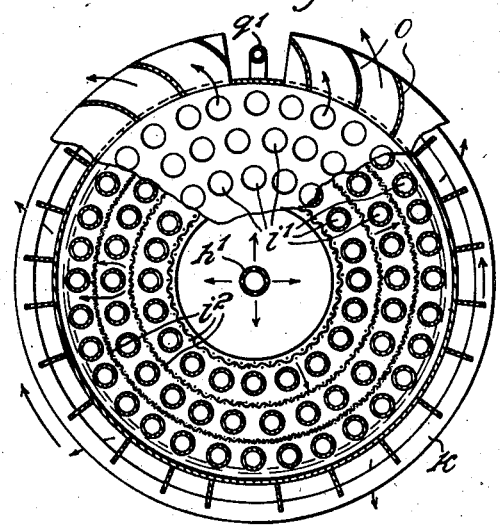

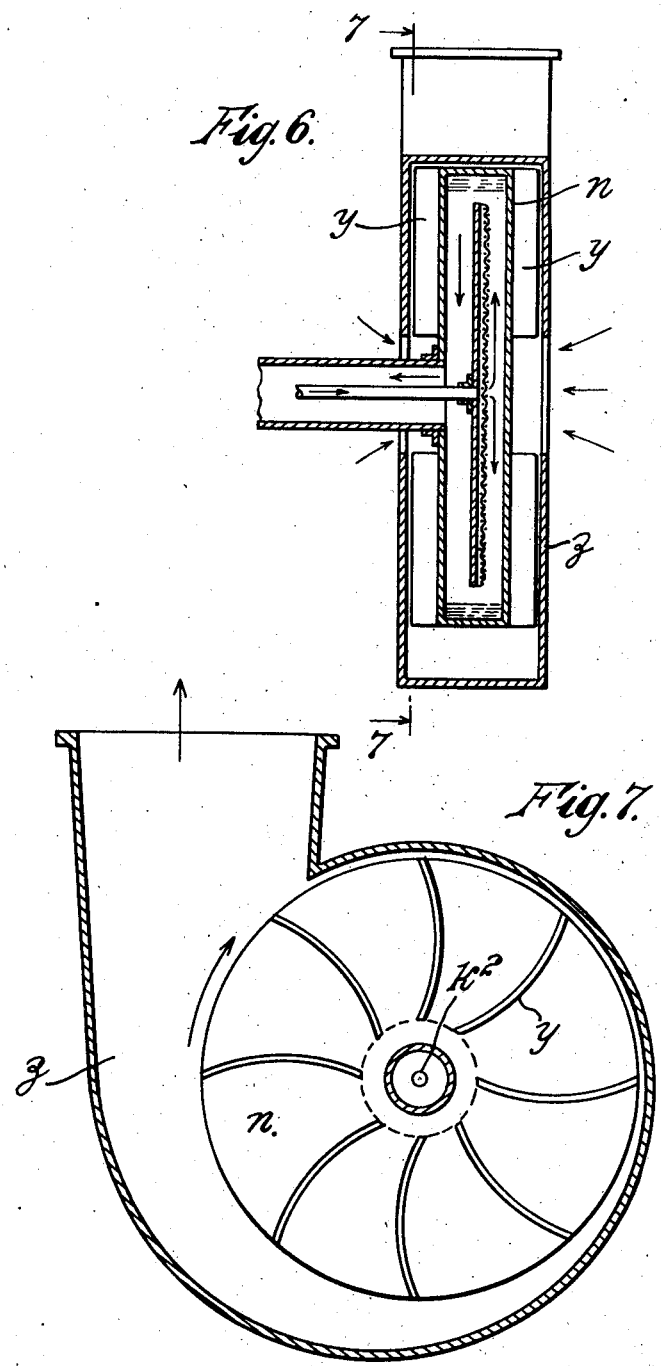

Patented Apr. 16, 1940

2,197,001

UNITED STATES PATENT OFFICE 2,197,001

ABSORPTION REFRIGERATING MACHINE

Guido Maiuri, Aldwych, London, England

Application February 25, 1939, Serial No. 258,355
In Great Britain January 11, 1939

8 Claims. (Cl. 62—119)

This invention relates to absorption refrigerating machines, and its object is to provide an absorption refrigerating machine producing a merely cool temperature, and which is therefore suitable for being and can readily be embodied with a rotary fan, and thereby is available for air conditioning.

It has already been proposed to actuate the compressor of an entirely sealed compression refrigerating machine through the medium of a counterweight by rotation of the refrigerating machine as a whole. In the present invention the same method of actuation is applied to an absorption refrigerating machine, and the rotation of the machine as a whole is utilised through the medium of counterweights to raise the pressure of the absorption liquor from the absorber and evaporator pressure to the generator and condenser pressure.

For the above purpose, according to the invention, an entirely sealed absorption refrigerating machine is rotatably mounted and the absorption liquor is raised in pressure and delivered from the absorber to the generator of the machine by a pump rendered effective by the rotation of the machine relatively to a counterweight. The absorption liquor can be raised in pressure and delivered from the absorber to the generator by centrifugal force engendered by the rotation of the machine and centripetal displacement under kinetic energy of the centrifugal liquor, by a scoop held against rotation by a counterweight, which is encountered by and conducts towards the axis of rotation, the centrifugally projected and rotated liquor. Centrifugal and centripetal displacement of the liquor can be re-effected a plurality of times designed to raise the liquor to the desired pressure, namely to the pressure of the generator.

A rotary absorption refrigerating machine embodying the invention is illustrated, somewhat diagrammatically and by way of example, on the accompanying drawings, in which:

Fig. 2 is a cross section of the generator, on the line 2—2 of Fig. 1.

Fig. 3 is a cross section of the liquor pump, on the line 3—3 of Fig. 1.

Fig. 4 is a section of a detail of the liquor pump on a larger scale.

Fig. 5 is a cross section of the absorber, on the line 5—5 of Fig. 1.

Fig. 6 is an axial section showing a centrifugal fan embodied with the evaporator of the machine, and Fig. 7 is a cross section thereof on the line 7—7 of Fig. 6.

Figure 1:
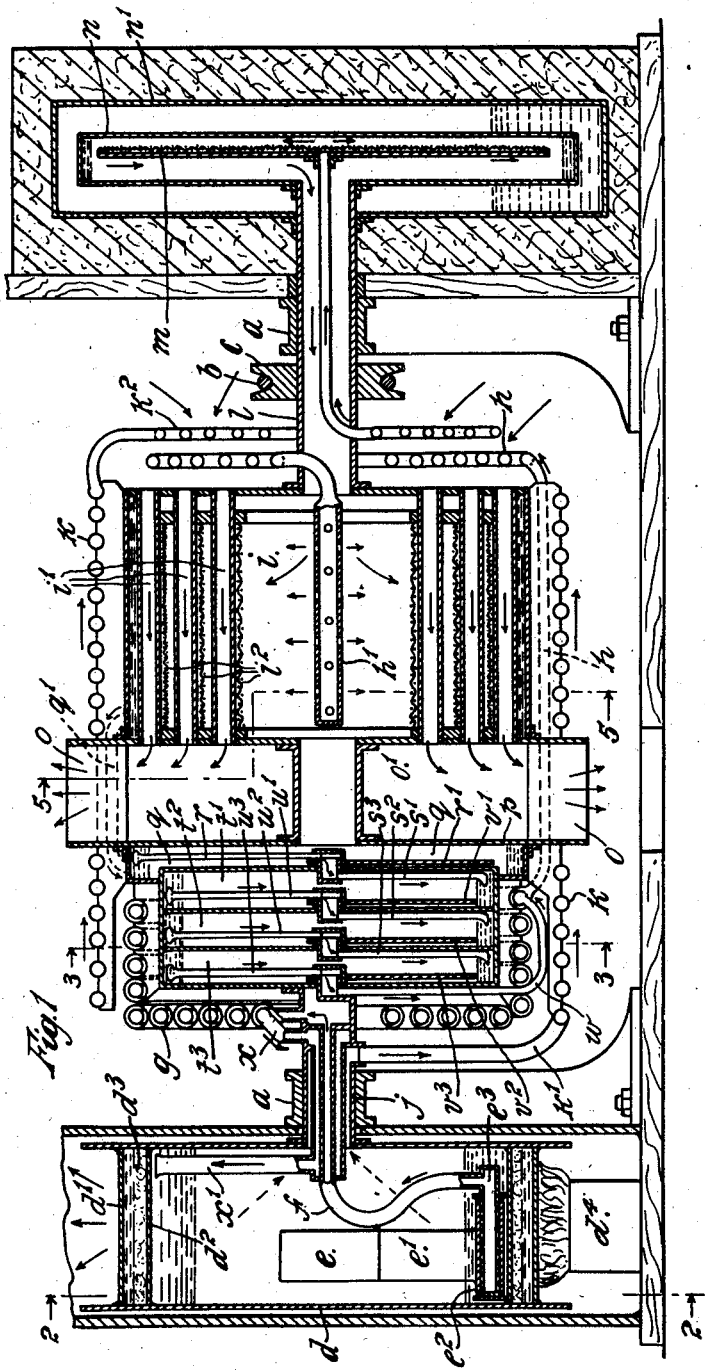
Fig. 1 is a longitudinal or axial section of the entire machine.

The entire absorption refrigerating machine is rotatably mounted in bearings $a$, and is rotated in a clockwise direction as viewed from the left of Fig. 1, by a belt $b$, enwrapping a pulley $c$.

The generator of the machine consists of a cylindrical drum $d$. The drum $d$ has an outer peripheral wall $d^1$ and an inner peripheral wall $d^2$ separated by an annular space $d^3$ partially occupied by a liquid, such as water.

The liquid in the annular space $d^3$ arranges itself as a thin layer against the inner surface of the outer peripheral wall $d^1$ and is heated by the flame of a burner $d^4$. The vapour from the liquid in the annular space $d^3$ heats and becomes condensed against the outer surface of the inner peripheral wall $d^2$, and heats absorption liquor contained in the cylindrical space within and centrifugally held against the inner peripheral wall $d^2$ and drives off refrigerant vapour from such liquor.

The liquor is maintained at a given depth in the generator $d$ by means of a float $e$ which is mounted on an arm $e^1$ fast on a sleeve $e^2$ journalled on a hollow journal $e^3$ extending parallel to the axis of rotation and close to the inner peripheral wall $d^2$. This hollow journal $e^3$ communicates at one end with an outlet pipe $f$ and is closed at the other end. The sleeve $e^2$ and the hollow journal $e^3$ are perforated and the perforations coincide when the float $e$ has been angularly displaced by its buoyancy, from the position shown, to bring the perforations into coincidence, whereupon the liquor can flow out of the drum along the pipe $f$. As usual, rich liquor is supplied to the generator and refrigerant vapour is driven off therefrom by heat and the so-impoverished liquor is forced out of the generator by the pressure of the driven-off vapour.

The float $e$ returns under centrifugal force aided by a spring $e^4$, to close the perforations.

The weak liquor passes from the pipe $f$ into the outer tubular member of a coaxial heat-exchanger coil $g$. Thence the weak liquor traverses an air cooled coiled pipe $h$ and eventually is delivered into an absorber $i$ by a central perforated pipe $h^1$.

The refrigerant vapour driven off in the generator $d$ passes by a hollow journal $j$ adjacent to the rotary generator drum $d$, to a pipe $k^1$ which is connected to a peripheral pipe coil $k$ constituting the condenser of the machine. From the condenser coil $k$, the condensed refrigerant passes by a coiled pipe $k^2$ to the axis of the machine where this pipe $k^2$ extends through another hollow journal $l$ of the machine to terminate at the center of a gauze-covered disc $m$. The liquid refrigerant is spread centrifugally over the gauze-covered disc $m$ and evaporates thereon. The gauze-covered disc $m$ is enclosed in a narrow closed drum $n$ which constitutes the evaporator of the machine. This evaporator drum $n$ rotates in an enclosed heat-insulated chamber $n^1$ partially filled with brine which it cools and which can be used for cooling purposes in the usual manner.

Refrigerant vapour from the evaporator $n$ passes along the interior of the hollow journal $l$ to the above mentioned absorber $i$.

The absorber $i$ consists of a drum traversed axially by several concentric annular series of open-ended tubes $i^1$. Each of these series of tubes $i^1$ supports a wire gauze cylinder $i^2$ the mesh of the gauze being progressively smaller the nearer the gauze is located to the periphery of the absorber drum $i$.

$o$ are fan blades which by the rotation of the machine draw air through the tubes $i^1$ and thereby cool the absorber $i$. These fan blades $o$ are mounted at the periphery of an annular free space $o^1$ into which the tubes $i^1$ lead, and comprised between the respective radial wall of the absorber drum $i$ and a radial partition disc $p$.

The liquor enriched in the absorber $i$ passes therefrom under the suction of a centrifugal and centripetal pumping device, now to be described, by a pipe $q^1$ into a drum $q$ on the side of the partition disc $p$ remote from the fan space $o^1$. The liquor is extracted from the drum $q$ by a scoop-ended pipe $r$ rotatably mounted about the axis of the machine and maintained against rotation by a counterweight $r^1$ and presenting its scoop end opposed to the direction of rotation. This scoop pipe $r$ communicates at the axis of the machine with a radial pipe $s^1$ rotating with the machine and in which by centrifugal force the liquor is carried to the periphery of a drum chamber $t^1$. From the periphery of the drum chamber $t^1$ the liquor is scooped and conveyed to the axis of the machine by a scoop pipe $u^1$ rotatably mounted and maintained stationary by a counterweight $v^1$.

The liquor is successively acted upon centrifugally by rotating pipes $s^2$ and $s^3$ in drum chambers $t^2$ and $t^3$ and centripetally by scoop pipes $u^2$ and $u^3$, maintained stationary by counterweights $v^2 v^3$, whereby the liquor is raised in pressure to the generator pressure.

The scoop pipe $u^3$ of the last centrifugal pumping chamber $t^3$ is conected by a pipe $w$ and delivers the rich liquor to the inner tubular member of the above-mentioned heat-exchanger coil $g$. The other end of the inner member of the heat-exchanger coil $g$ is connected to a pipe $x$ which extends through the hollow journal $j$ and terminates in a radial pipe $x^1$, which delivers the rich liquor into the generator drum $d$.

The multi-stage centrifugal pump should be progressively heated so that the vapour pressure of the pumped rich liquor remains at each stage approximately equal to the mechanically generated pressure, otherwise the pressure mechanically generated cannot be maintained as it will be almost neutralized by absorption of refrigerant vapour from the central space of each pumping chamber $t^1$, $t^2$, $t^3$. For this purpose these pumping chambers are in heat-conductive relationship with the heat-exchanger $g$, being as illustrated peripherally surrounded thereby. Alternatively or in addition, the hollow journal $j$ may be sufficiently massive to conduct heat from the generator drum $d$ to the multi-stage pumping chambers.

The refrigerant and the absorbent liquid are preferably such that the machine is under only low internal pressure, so that the necessary increase of pressure of the liquor to the generator pressure can be effected by a small number of stages of centrifuging. Suitable refrigerants and absorbents for example are dichlorethylene and paraffin oil or ethylchloride and fusel oil. For example with dichlorethylene as the refrigerant and paraffin oil as the absorbent, approximately the pressure may be 0.3 atmosphere absolute and the temperature $+25°$ C. in the absorber and chamber $q$, 0.4 atmosphere absolute and the temperature $+36°$ C. in the first pumping chamber $t^1$, 0.5 atmosphere absolute and the temperature $+47°$ C. in the second pumping chamber $t^2$, 0.6 atmosphere absolute and the temperature $+58°$ C. in the third pumping chamber $t^3$, and 0.65 atmosphere absolute and the temperature of ebullition of $+80°$ C. in the generator $d$, the weak liquor leaving the generator at $+100°$ C.

The increase of pressure due to kinetic action in each of the scoop pipes $r$, $u^1$, $u^2$ and $u^3$ will owing to loss by eddies be slightly less than the increase of pressure due to centrifugal action in each of the centrifugal pipes $s^1$, $s^2$ and $s^3$.

Instead of rotating in a heat-insulated brine-filled chamber, the evaporator drum $n$ can be provided with centrifugal fan blades $y$ and rotated in a volute fan casing $z$, as illustrated in Figs. 6 and 7. The air driven by the fan is delivered along and cooled by the surface of the evaporator drum $n$, and can be used in an air conditioning plant.

I claim:

1. In an entirely sealed absorption refrigerating machine, a generator, a condenser connected to said generator, an evaporator connected to said condenser, an absorber connected to said evaporator, and a liquor pump connected between said absorber and said generator, all rotatably mounted, and counterweighted means within and rendering said pump effective on rotation of said machine.

2. In an entirely sealed absorption refrigerating machine, a generator, a condenser connected to said generator, an evaporator connected to said condenser, an absorber connected to said evaporator, and a multi-stage centrifugal liquor pump connected between said absorber and said generator, all rotatably mounted, and counterweighted means within said pump for delivering liquor centrifugally to and from the stages thereof on rotation of said machine.

3. In an entirely sealed absorption refrigerating machine, a generator, a condenser connected to said generator, an evaporator connected to said condenser, an absorber connected to said evaporator, and a series of cylindrical chambers, all rotatably mounted, a counterweighted pipe presenting a scoop end opposed to the direction of rotation rotatably mounted within each of said cylindrical chambers and extending from the peripheral to the axial region thereof, and a pipe within and rotating with and extending from the axial towards the peripheral region of each succeeding cylindrical chamber and communicating with the counterweighted scoop-ended pipe of the preceding cylindrical chamber, said absorber being connected to the first of said series of cylindrical chambers and said generator to the scoop-ended pipe of the last thereof.

4. In an entirely sealed absorption refrigerating machine, a generator, a condenser connected to said generator, an evaporator connected to said condenser, a cylindrical absorber connected to said evaporator, and a liquor pump rendered effective by counterweight and connected between said absorber and said generator, all rotatably mounted, a plurality of concentric annular series of open-ended tubes extending through said cylindrical absorber, and wire gauze cylinders supported by said annular series of tubes.

5. In an entirely sealed absorption refrigerating machine, a generator, a condenser connected to said generator, an evaporator connected to said condenser, a cylindrical absorber connected to said evaporator, and a liquor pump rendered effective by counterweight and connected between said absorber and said generator, all rotatably mounted, a plurality of concentric annular series of open-ended tubes extending through said cylindrical absorber, wire gauze cylinders supported within said cylindrical absorber by said annular series of tubes, and fan blades mounted alongside said cylindrical absorber and drawing air through said open-ended tubes on rotation of said machine.

6. In an entirely sealed absorption refrigerating machine, a generator, a condenser connected to said generator, a cylindrical evaporator connected to said condenser, an absorber connected to said evaporator, and a liquor pump rendered effective by counterweight and connected between said absorber and said generator, all rotatably mounted, and a chamber enclosing said cylindrical evaporator and containing liquid contacting therewith.

7. In an entirely sealed absorption refrigerating machine, a generator, a condenser connected to said generator, a narrow cylindrical evaporator connected to said condenser, an absorber connected to said evaporator, and a liquor pump rendered effective by counterweight and connected between said absorber and said generator, all rotatably mounted, and fan blades on said narrow cylindrical evaporator.

8. In an entirely sealed absorption refrigerating machine, a cylindrical generator, a condenser, an evaporator connected to said condenser, an absorber connected to said evaporator, and a liquor pump rendered effective by counterweight and connected between said absorber and said generator, all rotatably mounted, a pipe interconnecting said generator and said condenser and extending from the peripheral region of said generator, and a float in said generator and controlling the inlet of liquor from said generator to said pipe.

GUIDO MAIURI.